United States Patent [19]

Stout et al.

[11] Patent Number: 5,172,797
[45] Date of Patent: Dec. 22, 1992

[54] MOTOR VEHICLE INERTIA AND HILL HOLDING BRAKING MECHANISM

[75] Inventors: Donald M. Stout, Troy; Otis J. Olson, Farmington Hills, both of Mich.

[73] Assignee: Eaton Corporation, Cleveland, Ohio

[21] Appl. No.: 825,348

[22] Filed: Jan. 24, 1992

[51] Int. Cl.⁵ .............................. F16D 67/04
[52] U.S. Cl. .................. 192/13 R; 192/12 C; 192/18 A
[58] Field of Search .................. 192/4 A, 13 R, 13 A, 192/18 A, 12 C; 74/339

[56] References Cited

U.S. PATENT DOCUMENTS

| | | | |
|---|---|---|---|
| 3,540,557 | 11/1970 | Hasselbacher et al. | 192/13 R X |
| 3,770,085 | 11/1973 | Cottingham | 192/13 R |
| 3,912,058 | 10/1975 | Parkins | 192/13 R X |
| 4,014,420 | 3/1977 | Riese | 192/13 R |
| 4,650,046 | 3/1987 | Parsons | 192/1.31 |
| 4,848,527 | 7/1989 | Kamio | 192/13 R |
| 4,867,291 | 9/1989 | Holman et al. | 192/4 A |

FOREIGN PATENT DOCUMENTS

| | | | |
|---|---|---|---|
| 2133778 | 1/1973 | Fed. Rep. of Germany | 74/339 |
| 2252131 | 6/1973 | Fed. Rep. of Germany | 192/13 R |
| 58-218432 | 12/1983 | Japan | 74/339 |
| 1425470 | 2/1976 | United Kingdom | 192/13 R |

Primary Examiner—Richard Lorence
Attorney, Agent, or Firm—A. E. Chrow

[57] ABSTRACT

An improved braking mechanism (100) is provided for use in conjunction with a change gear transmission (50) that is selectively engagable with a vehicle engine (4) by a clutch (3). Mechanism (100) has a piston (22) slidably received in a primary fluid chamber (34) that is operative to cause mechanism (100) to act as an inertia brake upon establishment of a first set of predetermined operating conditions. Piston (22) is also slidably received in a secondary fluid chamber (36) that is operative to cause mechanism (100) to act as a hill holding brake upon establishment of a second predetermined set of operating conditions.

6 Claims, 2 Drawing Sheets

MOTOR VEHICLE INERTIA AND HILL HOLDING BRAKING MECHANISM

INTRODUCTION

This invention relates generally to a mechanism operative to act as an inertia brake for slowing gears of a motor vehicle transmission in preparation for shifting upon establishment of a first set of predetermined operating conditions and to also act as a hill holding brake to prevent the motor vehicle from rolling backwards upon disengagement of the vehicle's clutch while the vehicle is ascending a hill below a predetermined minimum speed and particularly when the vehicle is starting from a stopped condition while on an incline with the clutch fully disengaged and/or modulated and/or partially disengaged or in the process of being engaged.

BACKGROUND OF THE INVENTION

Various kinds of motor vehicle hill holding mechanisms have been devised in the past for preventing roll back particularly during shifting while ascending a hill below some predetermined speed of which illustrative examples can be respectively found in U.S. Pat. Nos. 4,650,046 and 4,867,291, the disclosures of which are included herein by reference.

In U.S. Pat. No. 4,650,046 a hill holding device is provided that combines a one-way clutch with a singular pressurized fluid chamber actuated piston that operates to compress a plurality of friction brake plates to brake a motor vehicle transmission output shaft in response to a control signal derived from throttle position, vehicle speed, engine speed and gear selection.

In U.S. Pat. No. 4,867,291 a pressurized fluid actuated one-way clutch is utilized by itself to brake a vehicle transmission countershaft as a function of gear selection.

Hill holding systems commonly employ friction plates that are operative to release torque present in the driveline so that the transmission can be shifted such as when a one-way clutch in the drive line traps torque when the wheels are prevented from rolling when the vehicle pushes against a curb or other stationary obstacle.

Hydraulically actuated pistons used for compressing friction plates together in inertia brake and in hill holder systems have heretofore used a singular pressurized fluid chamber and have thus been limited on the amount of force created which is of importance in view of todays increasing vehicle loads. The present invention provides at least one additional secondary pressurized fluid chamber that enables force to be increased by the amount of cross-sectional area of the secondary chamber exposed to the piston which in turn eliminates the need to raise fluid pressure for singular fluid chamber systems beyond practical limits. The use of at least two pressurized fluid chambers allows the mechanism of the invention to act both as an inertia brake of relatively low torque to slow the speed of the transmission gears connected to the input shaft to synchronize for a normal upshift and to also act as a hill holding brake requiring relatively higher torque and operative to keep the vehicle from rolling backward down a hill when the master clutch is disengaged and the transmission is in a starting gear.

SUMMARY OF THE INVENTION

Accordingly, it is an object of this invention to provide a motor vehicle mechanism operative to act as an inertia brake for slowing transmission gears prior to shifting and as a hill holding brake operative to prevent roll back when the vehicle is ascending an incline below a predetermined vehicle speed and particularly when the vehicle is attempting to start from a stopped condition on an incline with the clutch fully disengaged and/or modulated and/or partially disengaged or in the process of being engaged.

It is another object of this invention to provide an improved motor vehicle mechanism that is operative to compress friction plates together with a force sufficient to act as an inertia brake and also with an increased force sufficient to cause the mechanism to act as a hill holding brake operative to prevent roll back of a motor vehicle ascending a hill below a predetermined minimum vehicle speed such as when the vehicle is starting up an incline at a slow speed when the clutch is disengaged for upshifting.

It is yet another object of this invention to provide a motor vehicle transmission in combination with a mechanism operative to act as an inertia brake and as a hill holding brake operative to brake an output shaft of the transmission with increased force so as to prevent roll back of the vehicle speed below a predetermined minimum and particularly when the vehicle is stopped on an incline with the transmission in gear and the master clutch disengaged or while attempting to start the vehicle with the master clutch partially engaged but not sufficiently to produce enough torque to move the vehicle up the incline.

DESCRIPTION OF SOME PREFERRED EMBODIMENTS

Figure 1:
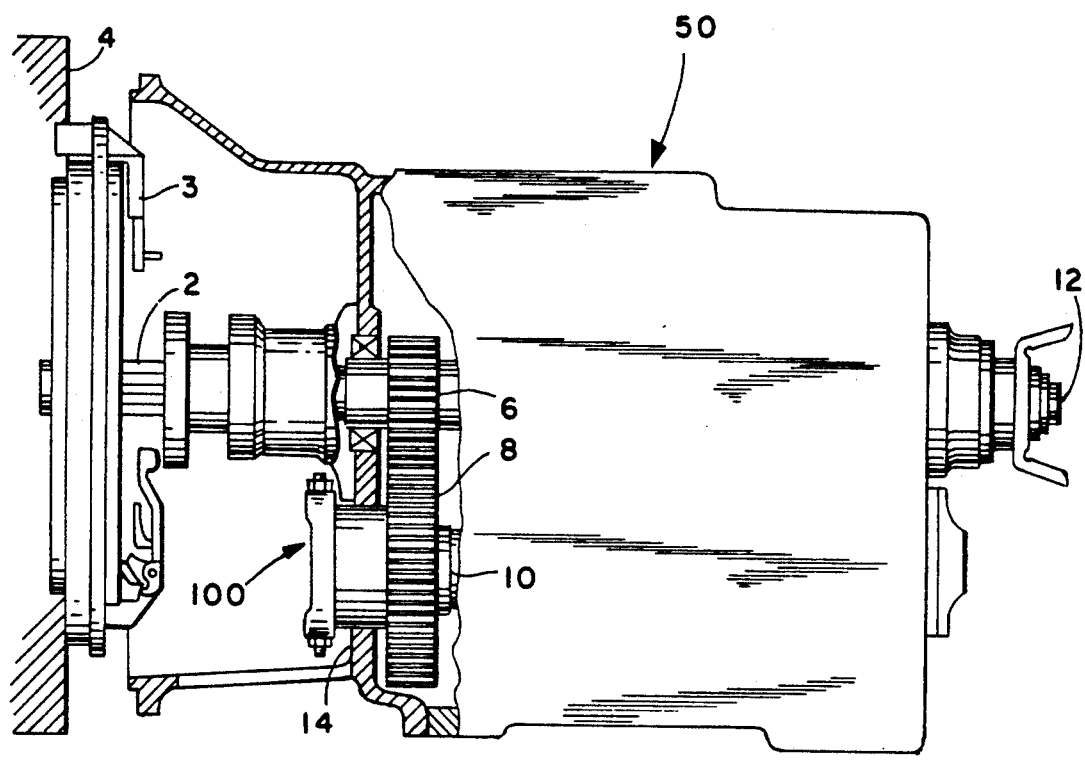
FIG. 1 is a partially broken-away side elevation view of a motor vehicle transmission 50 having the hill holder mechanism 100 of the invention installed.

In FIG. 1, a gear change transmission 50 has a rotary input shaft 2 driven by the vehicle's engine (not shown). Input shaft 2 is selectively coupled by clutch 3 to the engine 4. The teeth on input gear 6 of transmission 50 engage the teeth on countershaft gear 8 mounted on countershaft 10 enabling gear 6 to rotate countershaft 10. Countershaft 10 carries a plurality of gears that are selectively engagable with a plurality of mainshaft gears so as to rotate output shaft 12 at a rotational speed determined by the particular gear ratio selected between the mainshaft and countershaft gears. Output shaft 12 is part of the drive train enabling the vehicle engine to rotate the vehicles wheels.

Figure 2:
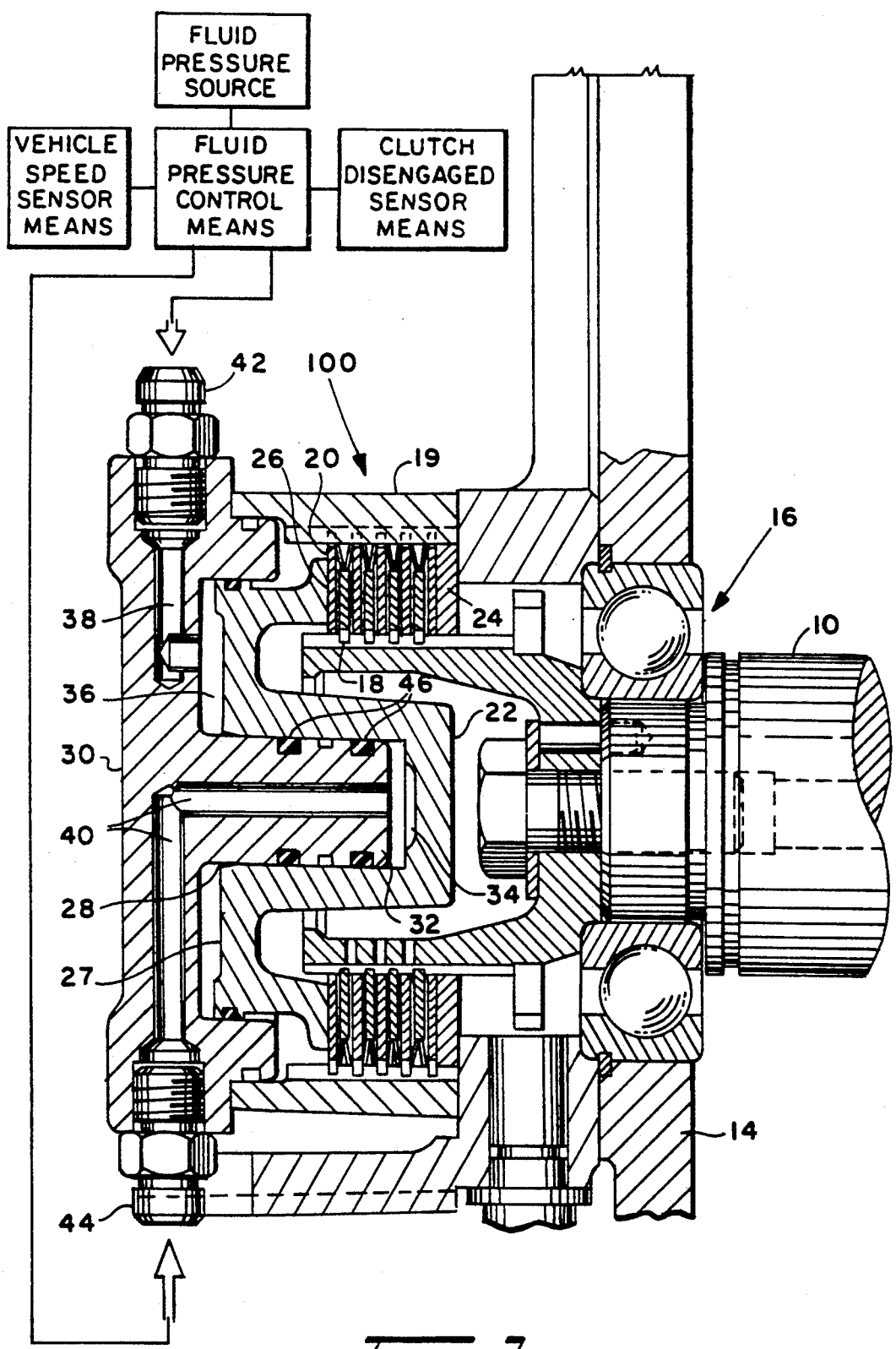
FIG. 2 is a central cross-sectional view of mechanism 100 of FIG. 1.

Transmission 50 is provided with a mechanism 100 made in accordance with the invention hereinafter described with respect to FIG. 2. As shown in FIGS. 1 and 2, mechanism 100 is preferably coupled to countershaft 10 at forward wall 14 of transmission 50.

As shown in FIG. 2, countershaft 10 is journaled for rotation by bearing assembly 16 mounted on wall 14 through which an end (not referenced) of countershaft 10 extends.

At least one and preferably a plurality of axially spaced-apart rotary friction plates 18 extend radially outwardly adjacent the end of countershaft 10. Rotary friction plates 18 are commonly splined to countershaft 10 and rotate in unison therewith.

A housing 19 surrounds the end of countershaft 10 from which at least one and preferably a plurality of axially spaced-apart stationary separator plates 20 extend towards countershaft 10 in the close proximity to rotary friction plates 18 as shown in FIG. 2. Rotary plates 18 and stationary plates 20 are interdigitated such that a rotary plate 18 extends into the space between a pair of stationary plates 20. Such combination of rotary and stationary plates is commonly called on inertia brake that, when pressed axially together, their respective frictional engagement enables the stationary plates to frictionally brake the rotary plates and thereby brake countershaft 10.

Rotary plates 18 and stationary plates 20 are compressed together by being urged against stop ring 24 by pressurized fluid actuated piston 22 such as by engagement of annular surface 26 thereagainst in an axial direction from left to right as viewed in FIG. 2.

Piston 22 has an open-ended bore 28 therein into which is received hub 32 extending axially towards the end of shaft 10 from backing plate 30 that is secured to housing 19. Piston 22 is supported by hub 32 and is adapted to slide reciprocally relative thereto.

A primary fluid chamber 34 is defined by the space between the end of hub 32 facing towards the bottom of bore 28. Pressurized fluid is conveyed through passageway 40 that is coupled to a suitable pressurized fluid source such as by fitting 44. The fluid, commonly a suitable non-corrosive hydraulic fluid, is characteristically pressurized by a pump driven by an electrical motor connected to the vehicle batteries through a suitable control circuit.

Piston 22 has an annular surface 27 at its opposite end that is in spaced-apart facing relationship to end plate 30 defining an annular space about the base of hub 28 exposed to surface 27 to provide secondary fluid chamber 36. Pressurized fluid is conveyed to fluid chamber 36 through passageway 38 that is coupled to the pressurized fluid source such as by fitting 42 as previously described for primary fluid chamber 34. Although secondary fluid chamber 36 preferably has an annular configuration and is disposed coaxially about primary chamber 34, one or more of such secondary fluid chambers may be disposed in a tandem axial spaced relationship to chamber 34.

Fluid sealing means such a pair of spaced-apart resilient O-rings 46 are disposed about hub 32 and engage the wall of bore 28 to separate and prevent fluid from passing between primary fluid chamber 34 and secondary chamber 36.

Pressurized fluid in primary chamber 34 enables mechanism 100 to act as an inertia brake by causing piston 22 to apply a first force compressing rotary friction plates 18 and stationary 20 together sufficiently to slow the transmission gears to the extent desired.

The addition of at least one secondary fluid chamber such as secondary fluid chamber 36 enables the force of piston 22 created by the pressurized fluid to be increased by the area of chamber 36 exposed to piston 22 sufficiently to enable mechanism 100 to act as a hill holding brake capable of releasing substantially higher torque. Although a single fluid passageway could be employed, the pressurized fluid is preferably conveyed to primary chamber 34 and second chamber 36 by separate fluid passageways so as to accelerate the rate of pressurization within the chambers and thus accelerate the braking action.

The control circuitry for actuating the braking mechanism of the invention preferably includes a pair of fluid control valves with one of the valves preferably responsive to open, for example, in response to clutch disengagement to enable pressurized fluid to flow into the primary fluid chamber to cause the mechanism to operate as an inertia brake to slow the transmission during shifting and the second valve responsive to a speed signal that enables pressurized fluid to flow into the secondary fluid chamber to cause the mechanism to act as a hill holding brake when, for example, the vehicle is on an incline and vehicle speed is below some predetermined minimum value such as one mile per hour and the clutch is disengaged. Other parameters may be employed to initiate the control signal that actuates the piston by causing pressurized fluid to enter the primary and secondary fluid chambers. Examples of such parameters include engine speed, throttle position, vehicle inclination, and gear shift positions.

More generally, the mechanism of the invention is operative to act as an inertia brake upon pressurization of fluid in the primary fluid chamber upon establishment of a first set of predetermined operating conditions such as disengagement of the clutch and is also operative to act as a hill holding brake upon pressurization of fluid in secondary fluid chamber or in both the primary and secondary fluid chambers upon establishment of a second set of predetermined operating conditions such as disengagement of the clutch and a vehicle speed below a predetermined value.

What is claimed is:

1. An improved braking mechanism for a vehicle having an engine selectively engageable with a gear change transmission by a clutch,
    said mechanism having a piston operative to urge at least one rotary friction plate against at least one stationary plate with a first force sufficient to cause the mechanism to act as an inertia brake for slowing the transmission gears in preparation for shifting upon establishment of a first predetermined set of operating conditions including at least disengagement of the clutch,
    means for sensing the first set of predetermined operating conditions and for controlling pressurized fluid flow into the primary chamber upon the establishment thereof, and
    means for sensing a second set of predetermined operating conditions including at least disengagement of the clutch and a vehicle speed that is below a predetermined minimum value,
    said improvement characterized by said mechanism having at least one secondary fluid chamber in which the piston is slideably received and means for controlling pressurized fluid flow into the secondary fluid chamber upon establishment of the second set of predetermined operating conditions such that, upon pressurization of fluid in said secondary fluid chamber, the piston is operative to urge said rotary friction plate against said stationary plate with a second force sufficiently larger than the first force to cause the mechanism to act on a hill holding brake when the vehicle is on an incline.

2. The mechanism of claim 1 wherein the pressurized fluid is delivered in both the primary and secondary fluid chambers upon the establishment of the second set of operating conditions.

3. The mechanism of claim 1 wherein the secondary fluid chamber is an annular chamber disposed coaxially about the primary fluid chamber.

4. In combination, a gear change transmission selectively engageable with a vehicle engine by a clutch and an improved braking mechanism, said mechanism having a piston operative to urge at least one rotary friction plate against at least one stationary plate with a first force sufficient to cause the mechanism to act as an inertia brake for slowing the transmission gears in preparation for shifting upon delivery of pressurized fluid into the primary fluid chamber in which the piston is slidably received upon establishment of a first predetermined set of operating conditions including at least disengagement of the clutch, means for sensing the first set of predetermined operating conditions and for controlling pressurized fluid flow into the primary chamber upon the establishment thereof, and means for sensing a second set of predetermined operating conditions including at least disengagement of the clutch and a vehicle speed that is below a predetermined minimum value, said improvement characterized by said mechanism having at least one secondary fluid chamber in which the piston is slideably received and means for controlling pressurized fluid flow into the secondary fluid chamber upon establishment of the second set of predetermined operating conditions such that, upon pressurization of fluid in said secondary fluid chamber, the piston is operative to urge said rotary friction plate against said stationary plate with a second force sufficiently larger than the first force to cause the mechanism to act as a hill holding brake when the vehicle is on an incline.

5. The combination of claim 4 wherein the fluid is pressurized in both the primary and secondary fluid chambers upon the establishment of the second set of operating conditions.

6. The combination of claim 4 wherein the secondary fluid chamber disposed coaxially about the primary fluid chamber.

* * * * *